April 28, 1925.  H. B. WALKER ET AL  1,535,386
CONVEYER
Filed March 17, 1923
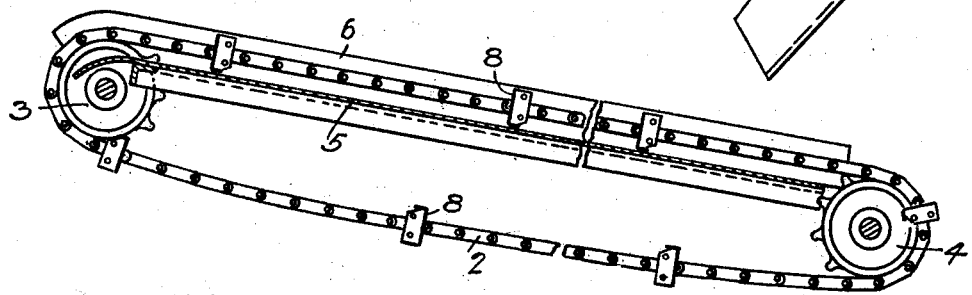
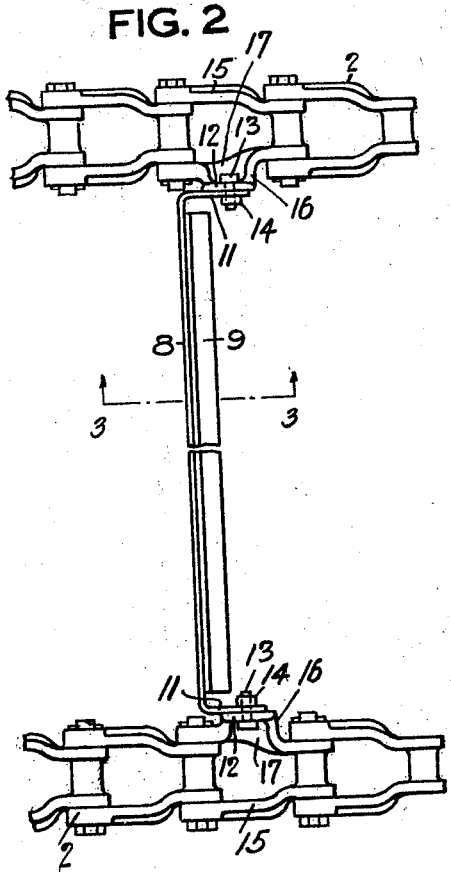
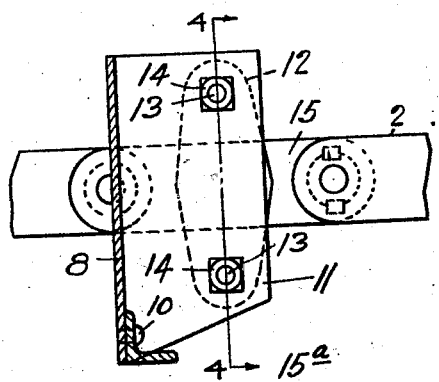
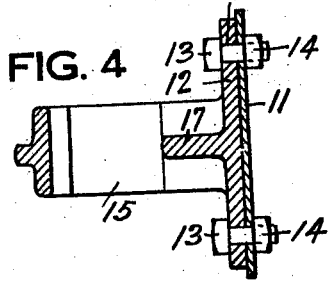
INVENTORS
Henry B. Walker and
Clarence O. Brown
By Kay, Totten Brown
attorney Patented Apr. 28, 1925.

1,535,386

UNITED STATES PATENT OFFICE.

HENRY B. WALKER AND CLARENCE O. BROWN, OF LANCASTER, OHIO, ASSIGNORS TO FAIRFIELD ENGINEERING COMPANY, OF MARION, OHIO, A CORPORATION OF OHIO.

CONVEYER.

Application filed March 17, 1923. Serial No. 625,743.

*To all whom it may concern:*

Be it known that we, HENRY B. WALKER and CLARENCE O. BROWN, citizens of the United States, and residents of Lancaster, in the county of Fairfield and State of Ohio, have invented a new and useful Improvement in Conveyers; and we do hereby declare the following to be a full, clear, and exact description thereof.

Our invention relates to conveyers, and it has special reference to the type of conveyer which includes parallel endless chain belts operating in a trough and having drag plates secured between the chain belts for advancing material through the trough.

The object of our invention is to provide an improved connection for securing the drag plates to the chain belts in conveyers of the character indicated, and to thereby overcome the breakage of chain links which frequently occurs when the drag plates are secured to the chain links in the usual manner.

In prior conveyers of the drag type, the drag plates are fastened directly across from side to side and the ends of the plates are attached rigidly to the chain links. Since the chains at both ends of the conveyer run over sprockets that are rigidly spaced, any bending of the drag plates draws in the spacing or gauge of the chains so that when they pass over the sprockets they will not fit the gauge of the sprockets and the link to which the drag plate is fastened is torn out or the connection is broken. The drag plates are often bent through overloading or accidental jamming, and the resulting breakage of chain links or drag plate connections is therefore a frequent source of annoyance.

According to our present invention we connect the drag plates to the side chains in such a way as to provide a certain amount of flexibility, so that if the drag plate should become bent the side chains will still be able to pass over the sprockets without straining or breaking any of the parts. We accomplish this by using a drag plate having thin flexible ends which are bent forward at each end and connecting the bent end portions with the ears on the side chains, the point of connection being some distance from the bend in the drag plate. This in effect lengthens the drag plates by an amount equal to twice the distance between the bend and the point of connection, this extra length being unused while the drag plates are straight, but being ready to compensate for any bending which through accident or overload may occur in the drag plate.

In the accompanying drawing, Fig. 1 is a side elevational view of so much of a drag conveyer as is necessary to illustrate our invention; Fig. 2 is an enlarged plan view of the chain belts and one of the drag plates; Fig. 3 is a still more enlarged sectional view, the section being taken substantially on the line 3—3, Fig. 2; and Fig. 4 is a sectional view through one of the chain links to which the drag chains are attached, the section being taken substantially on the line 4—4, Fig. 3.

In the drawing the numerals 2 indicate endless chain belts which run over front and rear sprockets 3 and 4. The upper runs of the chains traverse a trough composed of a bottom plate 5 and side plates 6. A chute is indicated diagrammatically at 7 for delivering loose material into the lower end of the trough.

The chains 2 carry drag plates 8 which are provided with removable angles 9 secured to the lower edges of the plates 8 by means of screw-bolts or rivets 10. Our invention is concerned with the manner in which the drag plates 8 are secured to the side chains 2, and this construction will now be described.

The thin, flexible ends of each of the drag plates 8 are bent forward, as best shown on Fig. 2, and the forward extensions 11 are attached to ears 12 which are formed integral with or secured to certain of the links of the side chains 2. The drag plate extensions 11 are secured to the ears 12 by means of bolts 13 and nuts 14, these bolts passing through openings 15 in the ears 12 and through corresponding openings in the drag plate extensions 11. It will be observed that the points of connection between the extensions 11 and the ears 12 are some distance in front of the bends in the drag plates. This distance may, for example, be about 1¼ inches or 1½ inches from the bend.

Each of the ears 12, as shown, is formed integral with one of the links 15 of the side chains 2, the links 15 being provided with lateral offsets 16 having strengthening webs 17, and the ears 12 being formed integral with these offsets.

The construction shown herein has been used with good results on portable conveyers, but it will be understood that our invention is not restricted to this type of conveyer, but may be applied equally well in any conveyer which includes drag plates or other drag members carried between endless chains or belts. It will also be understood that the details of construction herein shown and described may be varied in many respects without departing from our invention, the scope of which is indicated in the appended claims.

We claim as our invention:

1. A conveyer comprising two spaced endless members, drag members carried between said endless members, and means for yieldably connecting said drag members to said endless members to permit said drag members to be bent without materially altering the distance between said endless members.

2. A conveyer comprising two spaced chain belts, drag plates carried between said chain belts, and means for yieldably attaching said drag plates to said chain belts to permit said drag plates to bend without drawing said chain belts toward each other.

3. A conveyer comprising two spaced endless chain belts, drag plates extending between said chain belts and having flexible end portions that are bent forwardly at right angles to their intermediate portions, and means for attaching the bent end portions to said chain belts, the points of connection between said end portions and said chain belts being spaced substantially from said bends.

In testimony whereof we the said HENRY B. WALKER and CLARENCE O. BROWN, have hereunto set our hands.

HENRY B. WALKER.
CLARENCE O. BROWN.